(12) United States Patent
Aposhian et al.

(10) Patent No.: US 11,993,323 B2
(45) Date of Patent: May 28, 2024

(54) STEERING SYSTEM FOR A MOWER

(71) Applicant: FireFly Automatix, Inc., Salt Lake City, UT (US)

(72) Inventors: Steven R. Aposhian, Farmington, UT (US); Eric E. Aston, Farmington, UT (US); Mark C. LeBlanc, Salt Lake City, UT (US); Joshua W. Landry, Sandy, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 413 days.

(21) Appl. No.: 17/466,615

(22) Filed: Sep. 3, 2021

(65) Prior Publication Data
US 2023/0076632 A1    Mar. 9, 2023

(51) Int. Cl.
*B62D 5/04*    (2006.01)
*A01D 34/00*    (2006.01)

(52) U.S. Cl.
CPC .......... *B62D 5/0457* (2013.01); *A01D 34/006* (2013.01); *B60Y 2200/223* (2013.01); *B60Y 2400/84* (2013.01)

(58) Field of Classification Search
CPC .... A01D 34/006; A01D 34/008; A01D 75/30; A01D 69/02; A01D 2101/00
See application file for complete search history.

(56) References Cited

U.S. PATENT DOCUMENTS

| | | | |
|---|---|---|---|
| 10,980,171 B2 | 4/2021 | Aposhian et al. | |
| 2007/0151220 A1* | 7/2007 | Bergsten | A01D 67/00 56/2 |
| 2007/0151221 A1* | 7/2007 | Bergsten | A01D 42/08 56/15.8 |
| 2009/0000839 A1* | 1/2009 | Ishii | B62D 11/04 701/41 |
| 2009/0260901 A1* | 10/2009 | Ishii | B60L 15/2036 701/70 |
| 2012/0159916 A1* | 6/2012 | Ishii | B60L 1/003 56/10.2 G |
| 2012/0227368 A1 | 9/2012 | Koike et al. | |
| 2016/0183451 A1 | 6/2016 | Conrad et al. | |
| 2017/0120755 A1* | 5/2017 | Ito | B60L 3/10 |
| 2019/0111789 A1 | 4/2019 | Matsuda et al. | |
| 2019/0126748 A1* | 5/2019 | Graham | A01B 69/006 |
| 2020/0245560 A1* | 8/2020 | Legault | A01D 69/025 |
| 2020/0359565 A1 | 11/2020 | Yamada et al. | |

FOREIGN PATENT DOCUMENTS

WO    2021159018 A1    8/2021

OTHER PUBLICATIONS

International Searching Authority, International Search Report and the Written Opinion, Dec. 6, 2022.

* cited by examiner

*Primary Examiner* — John Kwon
(74) *Attorney, Agent, or Firm* — Kirton McConkie; Brian Tucker (57) ABSTRACT

A steering system for a mower can include a wheel-specific driving unit for each wheel and a controller for providing control signals to each wheel-specific driving unit to thereby cause each wheel to be independently rotated at a different speed during a turn. By independently rotating each wheel, the mower can complete a turn without damaging the grass. The controller may also provide control signals to cause each steerable wheel to be positioned in a different wheel direction during the turn.

16 Claims, 7 Drawing Sheets

STEERING SYSTEM FOR A MOWER

CROSS-REFERENCE TO RELATED APPLICATIONS

N/A

BACKGROUND

Golf courses, sod farms, parks and other establishments with expansive grassy areas typically employ large commercial mowers to cut grass. A typical commercial mower may include multiple "mower decks" that house the cutting blades. Unlike a common residential mower, the mower deck of commercial mowers typically houses multiple (e.g., 2-4) cutting blades.

Figure 1:
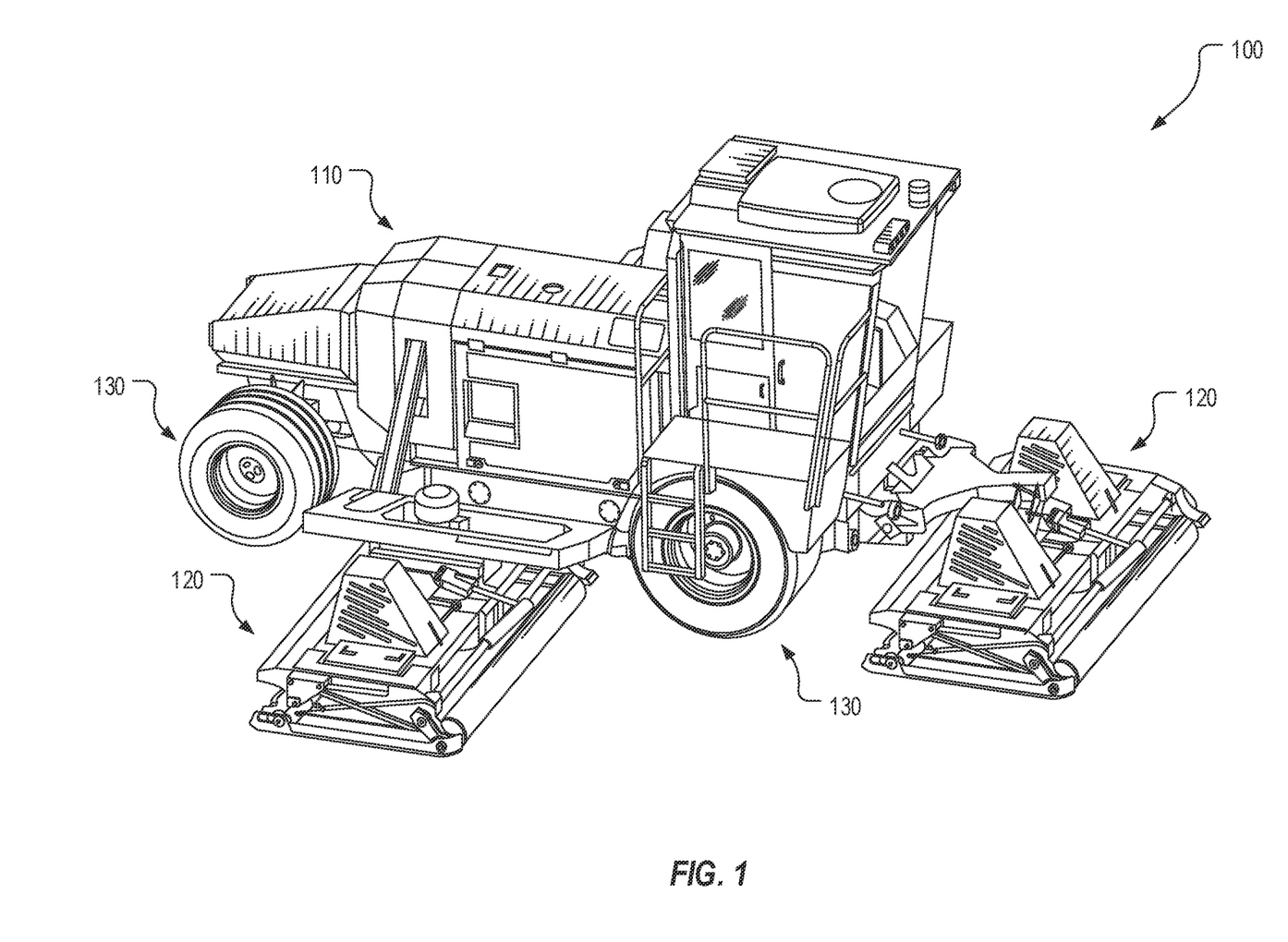
FIG. 1 illustrates an example of a mower on which embodiments of the present invention could be implemented.

FIG. 1 provides an example of a mower 100 that may be used to cut large grassy areas. Mower 100 includes a main body 110 which is in the form of a tractor. Wheels 130 are positioned at each corner of main body 110. Multiple mower decks 120 are positioned in front of and to the sides of main body 110.

BRIEF SUMMARY

The present invention extends to a steering system for a mower, mowers that include such a steering system and corresponding methods for steering a mower. A steering system can include a wheel-specific driving unit for each wheel and a controller for providing control signals to each wheel-specific driving unit to thereby cause each wheel to be independently rotated at a different speed during a turn. By independently rotating each wheel, the mower can complete a turn without damaging the grass. The controller may also provide control signals to cause each steerable wheel to be positioned in a different wheel direction during the turn.

In some embodiments, the present invention may be implemented as a mower that includes a main body, one or more mower decks supported from the main body, wheels that support the main body, wheel-specific driving units for the wheels and a controller. The controller can calculate different wheel speeds for the wheels during a turn and provides the different wheel speeds to the wheel-specific driving units to thereby cause the wheels to be rotated at the different wheel speeds.

In some embodiments, the present invention may be implemented as a steering system for a mower that includes a wheel-specific driving unit for each wheel of a plurality of wheels of the mower and a controller. The controller can be configured to detect a current ground speed and a steering direction of the mower, calculate different wheel speeds for the wheels based on the current ground speed and the steering direction and provide the different wheel speeds to the wheel-specific driving units to thereby cause the wheels to be rotated at the different wheel speeds.

In some embodiments, the present invention may be implemented by a controller as method for steering a mower. A controller can detect a current ground speed and a steering direction of the mower. Based on the current ground speed and the steering direction, the controller can calculate a different wheel speed for each of a plurality of wheels of the mower. The controller can then cause each of the plurality of wheels to be rotated at the corresponding different wheel speed during a turn.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention can be implemented on any mower that includes wheels for propelling the mower across the ground. Such mowers may oftentimes include multiple mower decks, but the present invention should not be limited by the number of mower decks that a mower may have. Such mowers may also be manually driven or autonomous.

Figure 2:
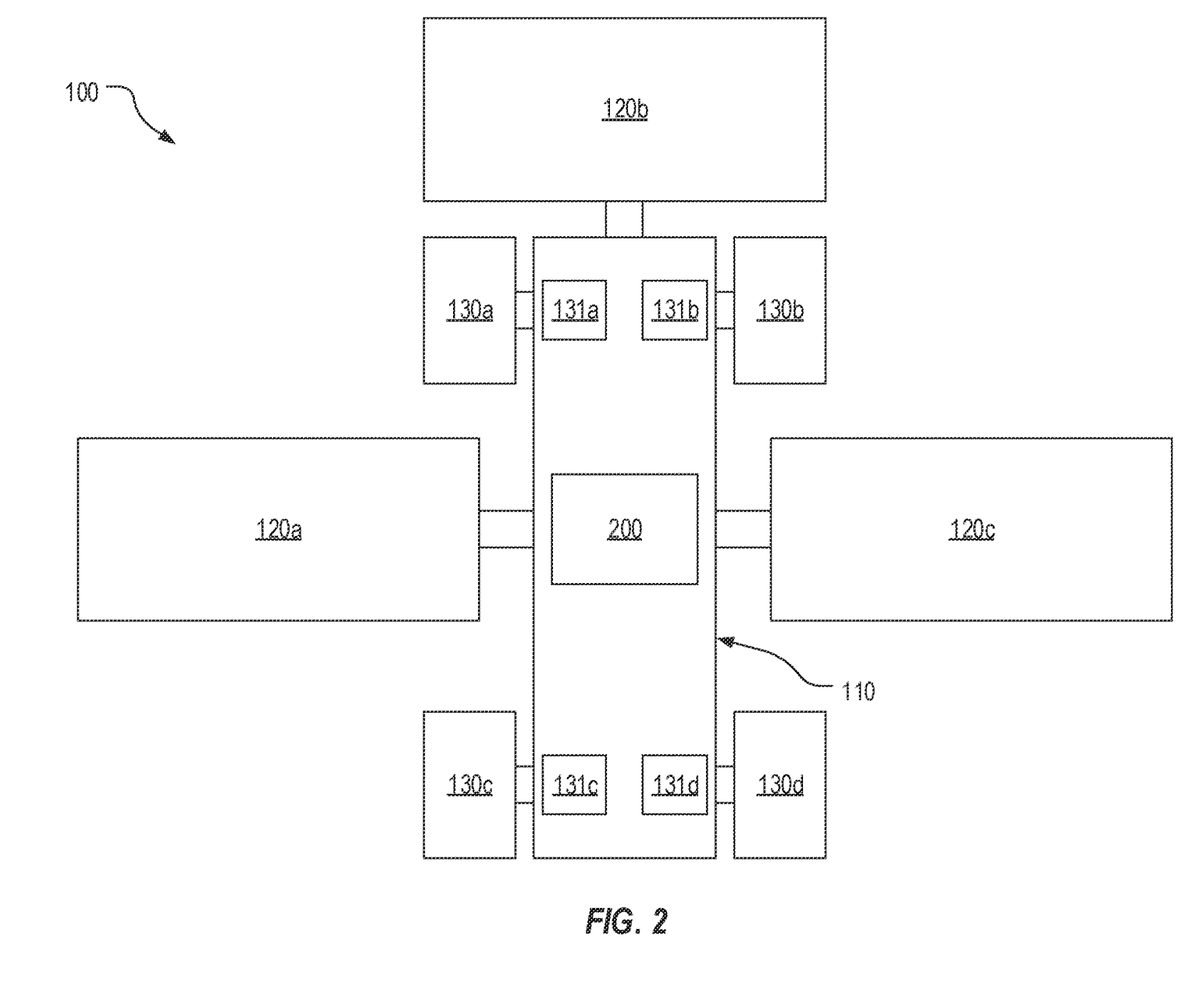
FIG. 2 is a block diagram of components of a mower that can be employed to implement embodiments of the present invention.

FIG. 2 provides a block diagram of mower 100 when it is configured in accordance with one or more embodiments of the present invention. As shown, main body 110 can support a left mower deck 120a, a front mower deck 120b and a right mower deck 120c. However, the number and configuration of mower decks is not essential to embodiments of the present invention. Mower 100 can also include a front, left wheel 130a, a front, right wheel 130b, a rear, left wheel 130c and a rear, right wheel 130d on which main body 110 is supported. Mower 100 may also include a controller 200 which can represent any suitable circuitry for accomplishing the functionality described herein including, but not limited to, a central processing unit, a microprocessor, a microcontroller, a field programming gate array, an application-specific integrated circuit, a system on a chip, etc.

Mower 100 may also include a wheel-specific driving unit 131a-131d for each wheel 130a-130d respectively. Driving units 131a-131d can represent any suitable components for accomplishing the functionality described herein and can include a motor for causing the corresponding wheel 130a-130d to rotate at a particular speed. In embodiments where mower 100 is configured to be steered by rear wheels 130c and 130d, rear driving units 131c and 131d can also include a steering mechanism (e.g. a linear actuator, whether electric, hydraulic or otherwise, such as a rack and pinion) for orienting wheels 130c and 130d respectively at a particular angle relative to main body 110. In embodiments where mower 100 is configured to be steered by front wheels 130a and 130b, front driving units 131a and 131b can include a steering mechanism (e.g. a linear actuator, whether electric, hydraulic or otherwise, such as a rack and pinion) for orienting wheels 130a and 130b respectively at a particular angle relative to main body 110.

Regardless of the specific type of components that may be used to implement driving units 131a-131d, each driving unit can be configured to receive control signals from controller 200 which define how the driving unit should drive the respective wheel. Notably, these control signals can cause driving units 131a-131d to each rotate corresponding wheel 130a-130d at a different speed. Also, these control signals can cause driving units 131c and 131d (in rear-wheel steering embodiments) or driving units 131a and 131b (in front-wheel steering embodiments) to orient corresponding rear wheels 130c and 130d or corresponding front wheels 130a and 130b respectively at different angles relative to main body 110. Although the description will focus on embodiments where only the rear wheels 130c and 130d or only the front wheels 130a and 130b are steered, the present invention encompasses embodiments where all four wheels 130a-103d may be steered.

Figure 3:
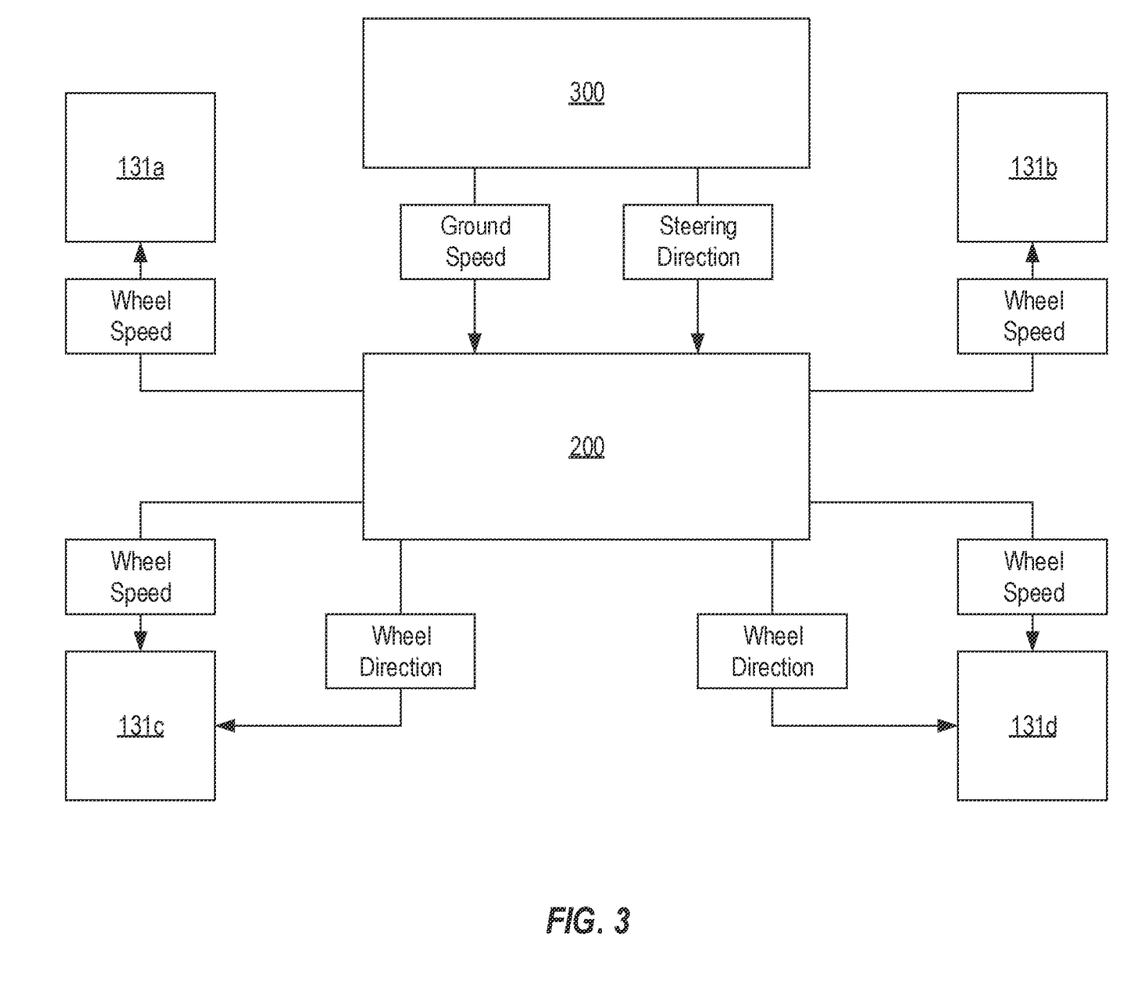
FIG. 3 provides an example of how various components can communicate to implement embodiments of the present invention.

FIG. 3 provides an example of the control signals controller 200 may provide to driving units 131a-131d in rear-wheel steering embodiments. As shown, controller 200 may provide control signals defining a wheel speed to all four driving units 131a-131d. In other words, controller 200 can provide a control signal to each driving unit 131a-131d that causes the driving unit to rotate the corresponding wheel at a particular rotational speed. In this way, controller 200 can cause each wheel 130a-130d to rotate at a different speed when mower 100 is turning. As described in detail below, the speeds at which wheels 130a-130d are rotated can be dynamically calculated based on the arcs that the wheels will travel during the turn and the current ground speed of the mower.

Similarly, given that FIG. 3 represents a rear-wheel steering embodiment, controller 200 may provide control signals defining a wheel direction to driving units 131c and 131d to thereby cause driving units 131c and 131d to orient wheels 130c and 130d at a particular angle relative to main body 110. As described in detail below, the angles at which wheels 130c and 130d are positioned can be dynamically calculated based on the arcs that the wheels will travel during the turn.

To enable controller 200 to calculate the control signals defining wheel speed and wheel direction, controller 200 may interface with one or more components 300 that can provide an indication of mower 100's current ground speed and steering direction. With regards to steering direction, in some embodiments, component(s) 300 could include a component of a steering wheel that provides an indication of the position of the steering wheel (e.g., an indication of how far a human operator has turned the steering wheel in a particular direction). In some embodiments, component(s) 300 could include a component of an autonomous driving system which provides a desired direction to turn or specifies a path that mower 100 should traverse.

With regards to ground speed, component(s) 300 could encompass any component that can detect the current ground speed of mower 100 including possibly any of driving units 131a-131d. Also, in some embodiments, components 300 may not be physically separate from controller 200. For example, controller 200 could include a first module for tracking current ground speed and a current position of the steering wheel and a second module that receives such information from the first module. In short, embodiments of the present invention could employ a wide variety and combinations of hardware, software and/or machinery to implement the techniques described herein, and the present invention should not be limited to any particular configuration. Of importance is the fact that controller 200 is configured to know the ground speed of the mower as it makes a turn as well as the direction and intended radius of the turn.

Figure 4A:
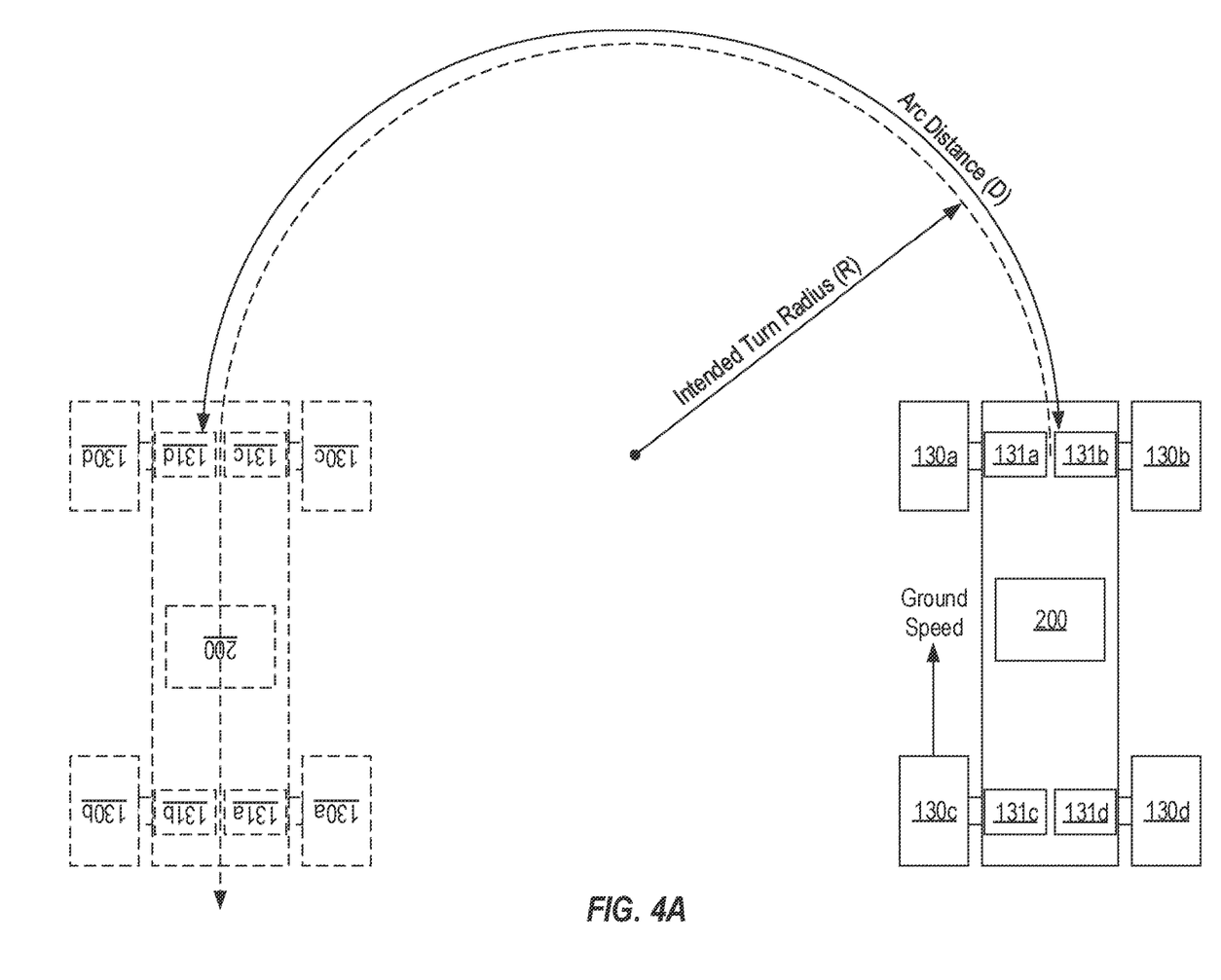
FIGS. 4A-4D provide an example of how a steering system of a mower can cause each wheel to be rotated at a different wheel speed during a turn and cause each steerable wheel to be oriented at a different wheel direction during the turn.
Figure 4B:
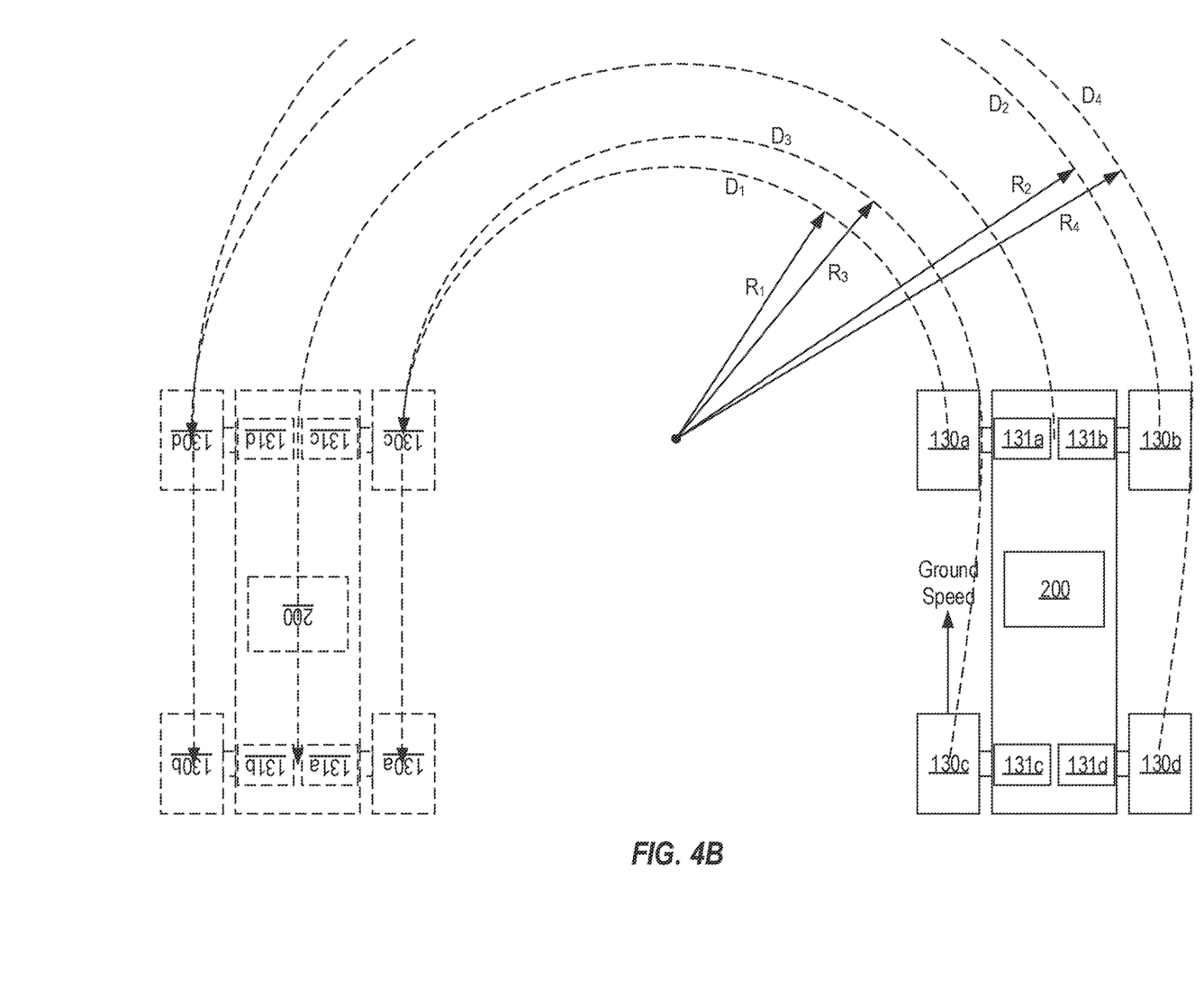

FIGS. 4A and 4B provide an example of how mower 100 may complete a 180-degree turn. In FIG. 4A, it is assumed that mower 100 is initially travelling in a straight direction at a particular ground speed and that controller 200 has detected that mower 100 is making or should make a left-hand turn. As an example, controller 200 could detect the current position of the steering wheel and determine that the current position corresponds with a particular turn radius for mower 100. As another example, controller 200 could determine that a predefined path over which mower 100 is being autonomously driven includes a turn with a particular radius.

As represented in FIG. 4B, although mower 100 itself can be considered as turning along a single radius R, each wheel 130a-130d will travel along a different radius $R_1$-$R_4$ respectively. In other words, mower 100's turn radius R can be considered as aligning with the center axis of main body 110. Given that each wheel 130a-130d is offset from this center axis, the wheels will travel along arcs with different radiuses. Wheels 130a-130d will therefore travel different distances $D_1$-$D_4$ respectively when mower 100 completes the 180-degree left-hand turn.

Prior to describing how embodiments of the present invention can optimize mower 100's turns, various problems that a typical steering system exhibits will be described. Without the techniques of the present invention, during the turn depicted in FIG. 4B, the rear-wheel steering would cause wheels 130c and 130d to turn in equal amounts towards the right which would cause the rear of main body 110 to pivot rightward relative to the front of main body 110. Due to this pivoting, as wheels 130a-130d continue to rotate, main body 110 will travel along the depicted arc thereby causing each wheel 130a-130d to travel along their respective arcs. However, because the arc travelled by each wheel 130a-130d during the turn has a different length ($D_1$-$D_4$) from the length (D) of the arc that main body 110 travels, the rotational speed of each wheel may not correspond with the ground speed of the wheel even if differentials are used. Likewise, the angle of each wheel may not align with (i.e., be tangent to) the arc along which it is travelling. As a result, at least some of wheels 130a-130d will likely skid along the ground at times during the turn. For example, because $D_2$ is substantially longer than D1, wheel 130b will travel a longer distance than wheel 130a during the turn. However, the rotational speed of wheel 130b may be tied to the rotational speed of wheel 130a. Therefore, if wheel 130a rotates at an appropriate speed to cause wheel 130a to roll smoothly along the $R_1$ arc, wheel 130b will rotate at the same speed while being dragged to keep up as it travels along the longer $R_2$ arc (i.e., wheel 130b is prevented from rotating at the faster speed that would be required to roll along the longer distance $D_2$ in the amount of time that wheel 130a rolls along the shorter distance $D_1$). This skidding/dragging of wheel 130b can damage the grass being cut, particularly newly growing grass.

To prevent such skidding of any of wheels 130a-130d, controller 200 can calculate a "wheel speed" for each wheel 130a-130d and a "wheel direction" for wheels 130c and 130d in rear-wheel steering embodiments, for wheels 130a and 130b in front-wheel steering embodiments or for all wheels 130a-130d in all-wheel steering embodiments. The term "wheel speed" should be construed as the speed at which the wheel is rotated and the term "wheel direction" should be construed as the angle of the wheel relative to main body 110. Controller 200 can calculate these wheel speeds and wheel directions based on the current ground speed and steering direction of mower 100. The term "steering direction" should be construed as any indication of a radius of a turn that mower 200 is performing or should perform. As mentioned above, the steering direction may oftentimes be defined by a position of the steering wheel.

Figure 4C:
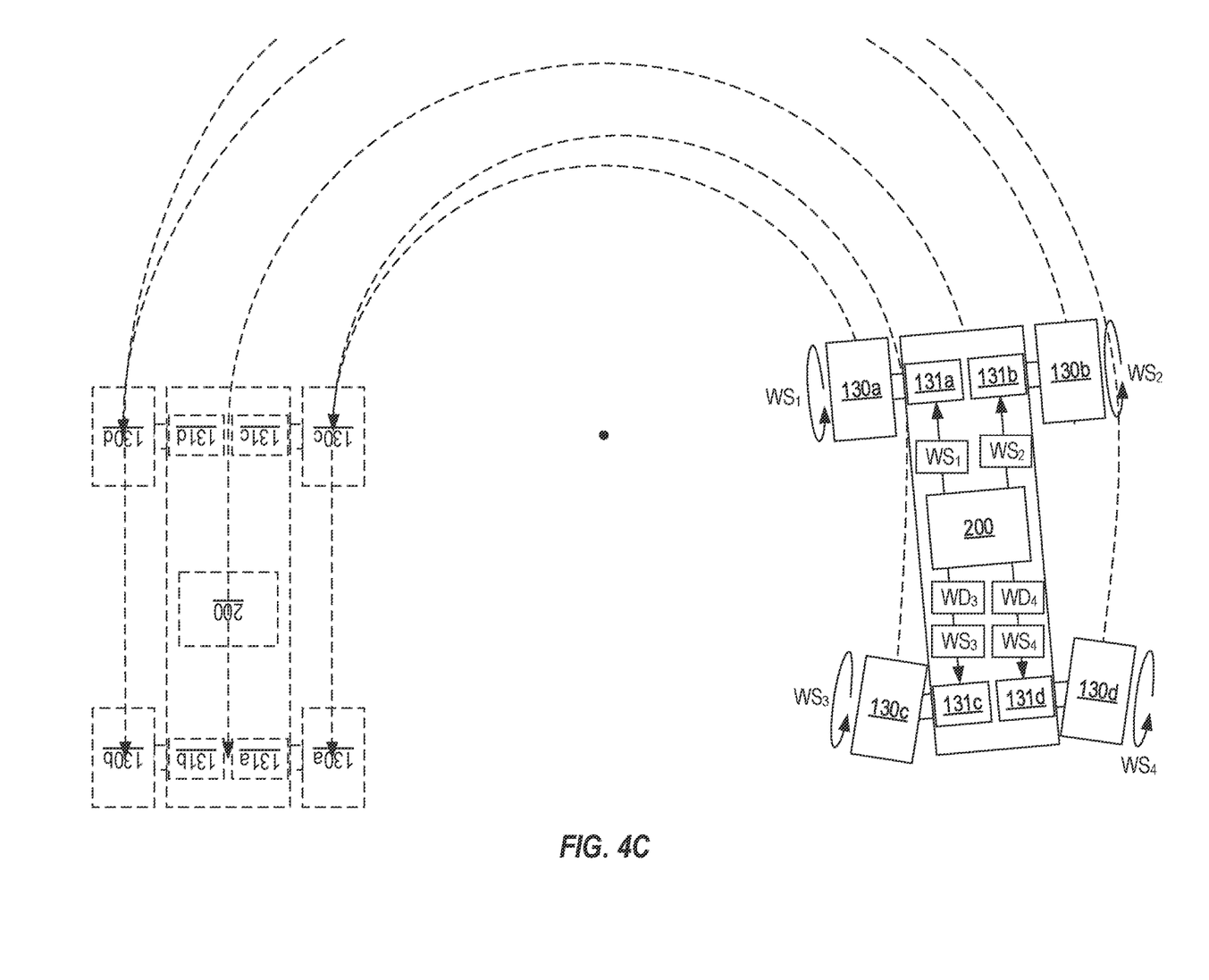

FIG. 4C represents how controller 200 can calculate a wheel speed for each of wheels 130a-130d and a wheel direction for each of rear wheels 130c and 130d based on a current ground speed and a steering direction of mower 100. Given that the relative positions of wheels 130a-130d are fixed, by knowing the steering direction, controller 200 can calculate the relative differences in the distances that each wheel 130a-130d will travel while turning and generate wheel speeds based on these relative differences and the current ground speed. For example, if the steering direction indicates that mower 100 is turning or should turn left along an arc having a radius (R) of 20 feet and mower 100's turning axis lies directly between front wheels 130a and 130b (such as is shown in the figures), controller 200 can calculate the radiuses $R_1$ and $R_2$ from its knowledge of the distance between mower 100's center axis and each front wheel 130a and 130b. For example, if each front wheel 130a and 130b is spaced 5 feet from the turning axis, $R_1$ and $R_2$ may be 15 feet and 25 feet respectively. Controller 200 can use its knowledge of the relative positions of rear wheels 130c and 130d, and particularly their relative positions during a turn, to determine $R_3$ and $R_4$. For example, mower 100 may be configured such that $R_3$ and $R_4$ are 20% larger than $R_1$ and $R_2$ during a left-hand turn.

Regardless of the exact technique it may use in any particular embodiment, controller 200 can calculate wheel speeds $WS_1$-$WS_4$ at which wheels 130a-130d should be rotated during the turn to ensure that the wheels roll smoothly along the arc they traverse. For example, with reference to FIG. 4C, controller 200 could determine that wheel 130a should be rotated at a wheel speed $WS_1$ where $WS_1$ is the rotational speed required to cause wheel 130a to roll along the $R_1$ arc without skidding while mower 100 travels at the current ground speed. By way of example, if R is 20 feet and the current ground speed is 8 feet per second, the distance D for a 180-degree left-hand turn would be 62.83 feet. It would therefore take 7.85 seconds to complete the turn. Assuming $R_1$ is 15 feet, the distance $D_1$ would be 47.12 feet. Accordingly, the ground speed of wheel 130a during the turn would be approximately 6 feet per second. In such a case, controller 200 could set $WS_1$ to correspond with this 6 feet per second ground speed. For example, if the circumference of the tire on wheel 130a is 6 feet, $WS_1$ could be selected to cause wheel 130a to complete one rotation per second. Controller 200 can employ similar calculations to select $WS_2$-$WS_4$. In short, controller 200 can select values for $WS_1$-$WS_4$ that correspond with the ground speeds at wheels 130a-130d respectively to ensure that each wheel rolls rather than skids along its particular arc.

As represented in FIG. 4C, controller 200 provides the wheel speeds $WS_1$-$WS_4$ to wheel-specific driving units 131a-131d respectively which in turn independently cause wheels 130a-130d to rotate at the respective wheel speeds. In particular, because each wheel-specific driving unit 131a-131d includes a motor, each wheel 130a-130d can be independently rotated at a different speed.

Figure 4D:
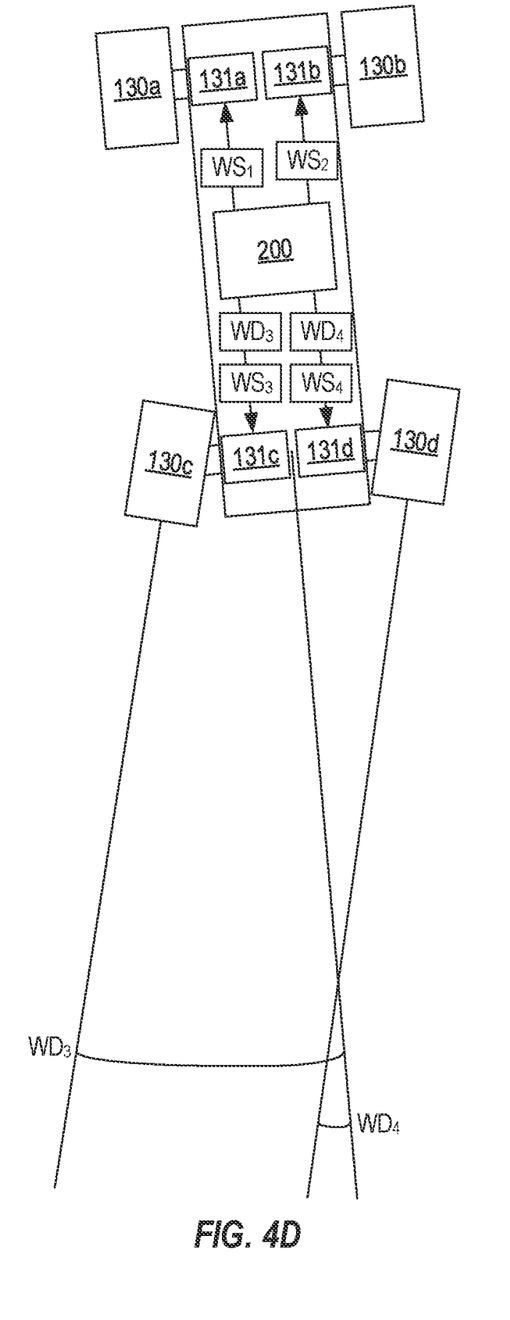

In some embodiments, controller 200 may only calculate wheel speeds. However, in other embodiments, such as the embodiments represented in FIG. 4C, controller 200 can also calculate the wheel direction for any wheel that is steerable. The wheel direction can be calculated based on the steering direction, or more particularly, based on the radius of the arc that the particular wheel will travel during the turn. In some embodiments, the wheel direction can be selected to cause the wheel to be positioned tangent to the arc that the wheel traverses. For example, FIG. 4D, which is based on FIG. 4C, represents a scenario where controller 200 has calculated wheel directions $WD_3$ and $WD_4$ for wheels 130c and 130d that cause wheels 130c and 130d to be tangent to the $R_3$ and $R_4$ arcs respectively during the left-hand turn. Controller 200 can provide $WD_3$ and $WD_4$ to wheel-specific driving units 131c and 131d to cause them to position wheels 130c and 130d at these tangent angles. By independently orienting each steerable wheel based on the steering direction, controller 200 can ensure that the steerable wheels roll without skidding along their different arcs. It is again noted that controller 200 could provide wheel directions to front wheels 130a and 130b in front-wheel steering embodiments or to all wheels 130a-130d in all-wheel steering embodiments.

In the above-described embodiments, it has been assumed that the turning axis of mower 100 is between front wheels 130a and 130b. However, embodiments of the present invention can equally be implemented regardless of the turning axis of a mower. For example, a mower could be configured to have a turning axis that is centered between the front and rear wheels in which case the front and rear left wheels may travel along the same arc and the front and rear right wheels may also travel along the same arc. Even in such cases, the techniques of the present invention can be implemented to ensure that each wheel is independently rotated at a wheel speed matching the ground speed at the particular wheel. Also, each steerable wheel can be oriented at a wheel direction based on the steering direction of the mower.

As suggested above, in some embodiments, controller 200 can be configured to employ the steering direction to determine relative differences in the distances each wheel 130a-130d will travel during a turn (e.g., using the known geometry of the wheels during turns). Controller 200 can apply these relative differences to the current ground speed of mower 100 to determine the current ground speed at each particular wheel and then select the wheel speeds to correspond with these wheel-specific current ground speeds. Similarly, controller 200 can be configured to employ the steering direction to determine the wheel directions using the known geometry of the steerable wheels during a turn.

Controller 200 can be configured to dynamically calculate/adjust the wheel speeds and wheel directions based on the current ground speed and current steering direction. For example, if the operator turns the steering wheel during a turn to thereby tighten or widen the radius of the turn, controller 200 can detect the new steering wheel position and adjust the wheel speeds and wheel directions accordingly. Similarly, if the operator adjusts the ground speed of mower 100 during the turn, controller 200 can detect the adjusted ground speed and adjust the wheel speeds accordingly. In this way, controller 200 can ensure that each of the four wheels is rotating at a speed that corresponds to the ground speed that the particular wheel is currently experiencing and that each steerable wheel is aligned with (e.g., tangent to) the arc that the particular wheel is traversing.

By implementing embodiments of the present invention, a mower can perform more efficient turns while minimizing the likelihood that the grass will be damaged by the wheels during the turns. Such techniques can be particularly beneficial on sod farms where newly planted grass is frequently cut and any damage caused by the mower may render the sod unusable.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A mower comprising:
   a main body;
   one or more mower decks supported from the main body;
   wheels that support the main body, the wheels including front wheels and rear wheels, wherein either the front wheels, the rear wheels or both the front and rear wheels are steerable wheels;
   wheel-specific driving units for the wheels; and
   a controller that:
   (1) calculates different wheel speeds for the wheels during a turn and provides the different wheel speeds to the wheel-specific driving units to thereby cause the wheels to be rotated at the different wheel speeds during the turn; and
   (2) calculates different wheel directions for the steerable wheels during the turn and provides the different wheel directions to the wheel-specific driving units for the steerable wheels to thereby cause the steerable wheels to be positioned in the different wheel directions during the turn.

2. The mower of claim 1, wherein the controller calculates the different wheel speeds based on a current ground speed and a steering direction of the mower.

3. The mower of claim 2, wherein the different wheel speeds correspond with current ground speeds of the wheels during the turn.

4. The mower of claim 1, wherein each wheel-specific driving unit includes a motor for rotating the corresponding wheel.

5. The mower of claim 1, wherein the rear wheels are steerable.

6. The mower of claim 1, wherein the front wheels are steerable.

7. The mower of claim 1, wherein the front and rear wheels are steerable.

8. A steering system for a mower comprising:
   wheels including front wheels and rear wheels, wherein the front wheels, the rear wheels or the front and rear wheels are steerable wheels;
   a wheel-specific driving unit for each of the wheels; and
   a controller that is configured to:
   detect a current ground speed and a steering direction of the mower;
   calculate different wheel speeds for the wheels during a turn based on the current ground speed and the steering direction;
   provide the different wheel speeds to the wheel-specific driving units to thereby cause the wheels to be rotated at the different wheel speeds during the turn;
   calculate different wheel directions for each of the steerable wheels during the turn based on the steering direction; and
   provide the wheel directions to the wheel-specific driving units for the steerable wheels to thereby cause the steerable wheels to be positioned in the different wheel directions during the turn.

9. The steering system of claim 8, wherein calculating different wheel speeds for the wheels based on the current ground speed and the steering direction comprises calculating a different wheel speed for each wheel where the different wheel speed corresponds with a current ground speed of the particular wheel.

10. The steering system of claim 8, wherein the rear wheels are steerable wheels.

11. The steering system of claim 8, wherein calculating different wheel directions for each of the steerable wheels based on the steering direction comprises calculating a wheel direction for each steerable wheel that is tangent to an arc that the steerable wheel travels during a turn.

12. A method, performed by a controller, for steering a mower comprising:
   detecting a current ground speed and a steering direction of the mower during a turn, the mower having wheels including front wheels and rear wheels, wherein the front wheels, the rear wheels or the front and rear wheels are steerable wheels;
   based on the current ground speed and the steering direction, calculating a different wheel speed for each of the wheels of the mower;
   causing each of the wheels to be rotated at the corresponding different wheel speed during the turn;
   calculate different wheel directions for each of the steerable wheels during the turn based on the steering direction; and
   cause each steerable wheel to be positioned in the corresponding different wheel direction during the turn.

13. The method of claim 12, wherein detecting the steering direction comprises detecting a position of a steering wheel.

14. The method of claim 12, wherein calculating the different wheel speed for each of the wheels of the mower comprises calculating a wheel speed for each wheel corresponding to a ground speed of the particular wheel during the turn.

15. The method of claim 12, wherein the rear wheels are steerable wheels.

16. The method of claim 12, wherein causing each of the wheels to be rotated at the corresponding different wheel speed during the turn comprises providing the different wheel speeds to wheel-specific driving units for the wheels.

* * * * *